Figure 1:
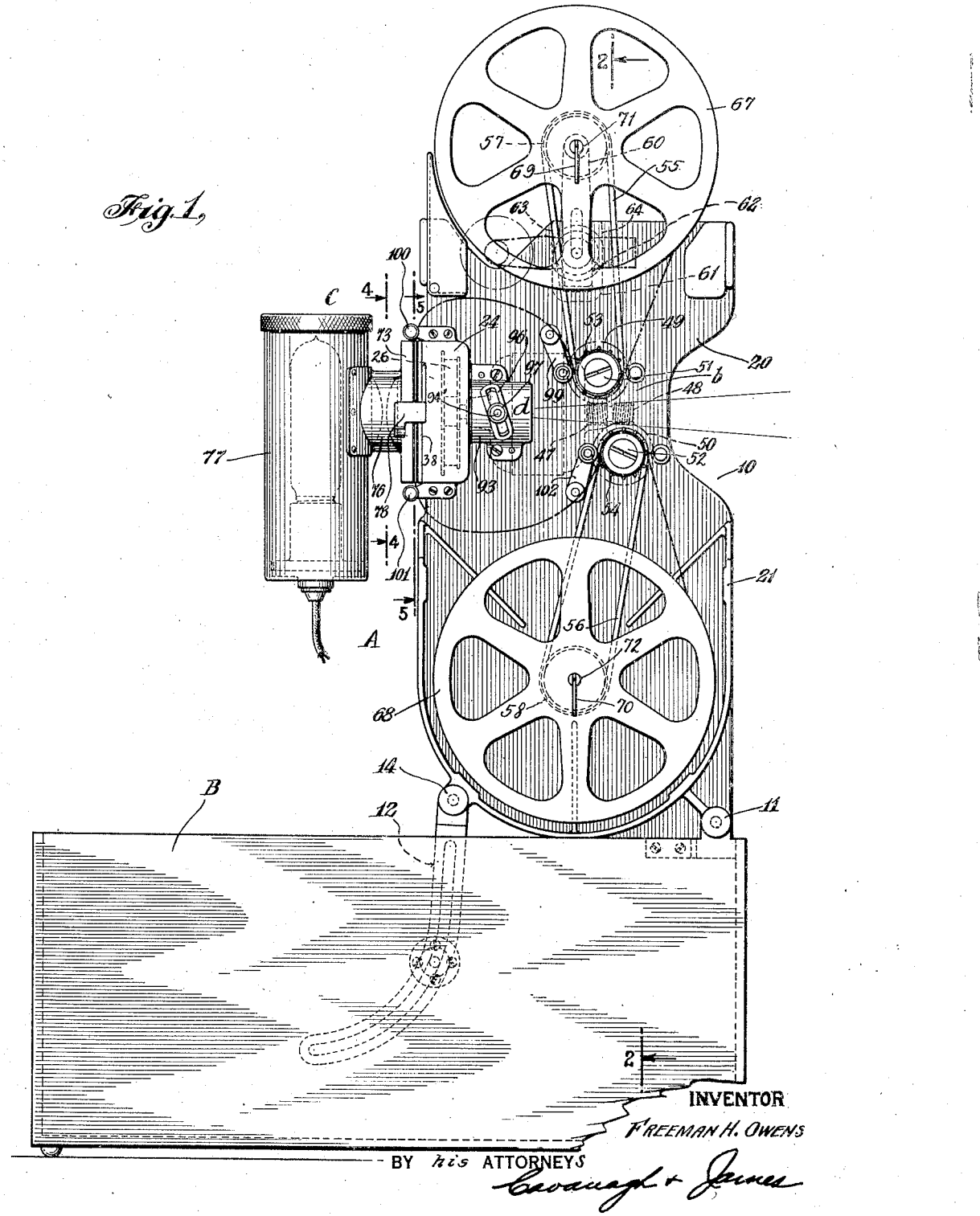

Sept. 18, 1928.

F. H. OWENS 1,684,968

MOTION PICTURE APPARATUS

Filed April 11, 1924  3 Sheets-Sheet 1

INVENTOR
FREEMAN H. OWENS
BY his ATTORNEYS
Cavanagh & James

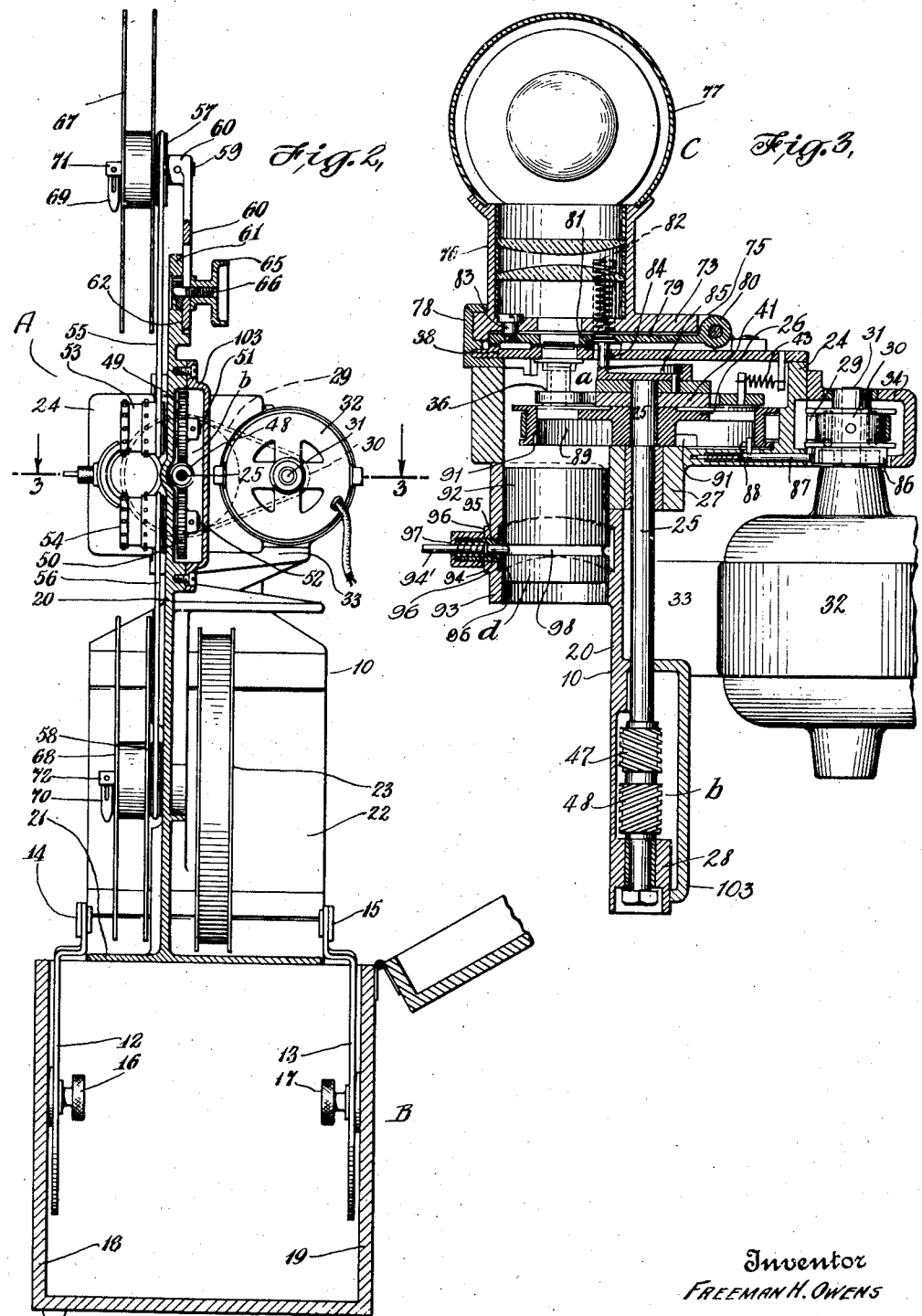

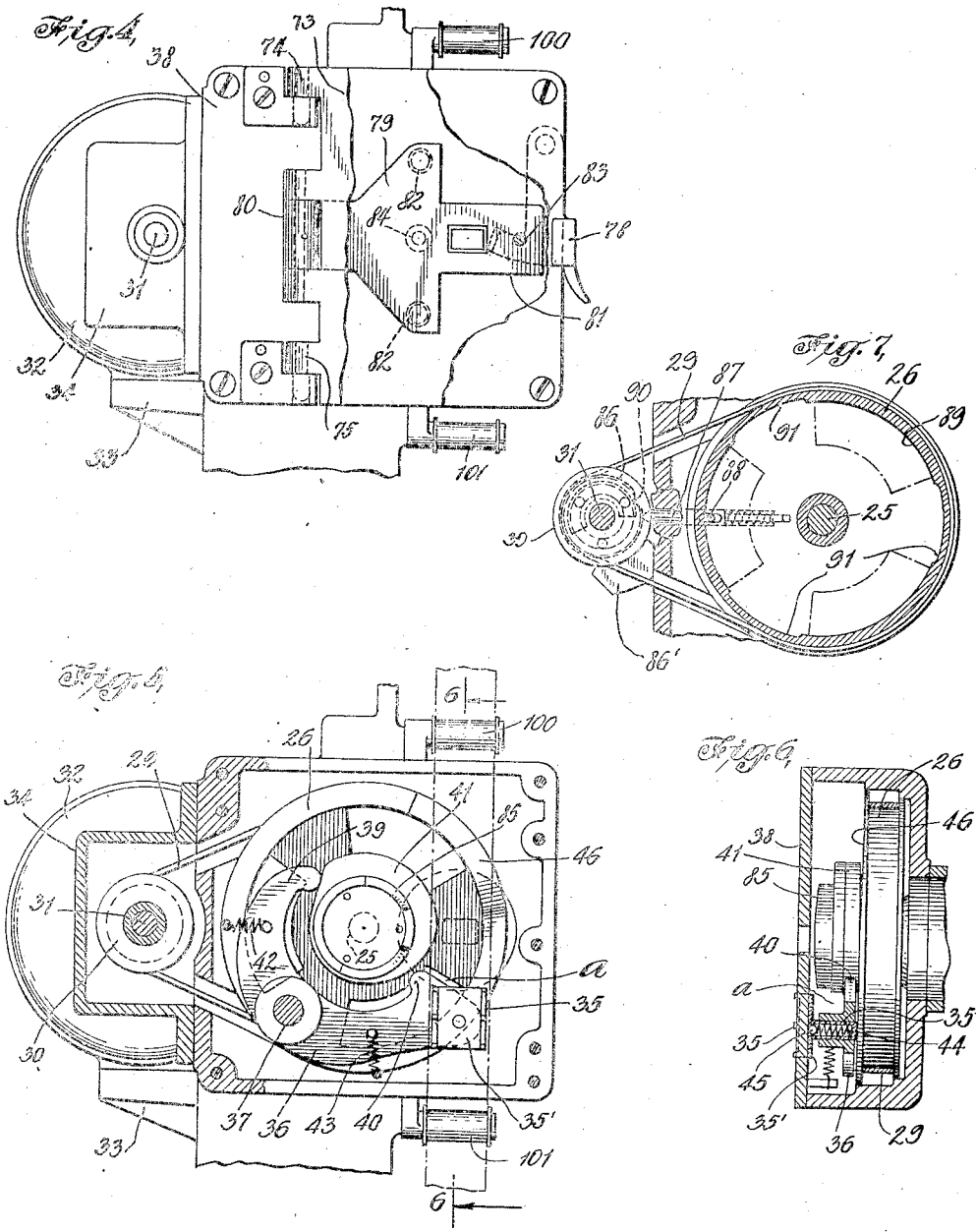

Patented Sept. 18, 1928.

1,684,968

UNITED STATES PATENT OFFICE.

FREEMAN H. OWENS, OF NEW YORK, N. Y.

MOTION-PICTURE APPARATUS.

Application filed April 11, 1924. Serial No. 705,804.

This invention relates to motion picture apparatus, and has special reference to the provision of an improved portable motion picture machine.

A prime desideratum of my present invention comprehends the provision of a motion picture machine in which the machine parts are designed, arranged and co-ordinated to produce a light-weight and compact portable organization, and in which such parts are inter-related in a simple way to efficiently produce the functions of intermittently feeding the film past the exposure window, of continuously feeding the film from the supply to the take-up reel, of shuttering the film during the intermittent movement thereof, and of illuminating the film and projecting the same upon an image receiving surface.

Among the principal and more specific objects of the invention are:

1. The provision of a portable apparatus in which the motion picture machine is adjustably movable on a portable casing in which the same may be boxed, the machine and the casing being so inter-related as to permit the latter to form a suitable base for the former when the machine is moved to an operating or projection position and to produce a balanced combination with the center of gravity properly located when the machine is moved to encased position;

2. The further provision of a supporting frame for the operating and operated parts of the machine which is of simple design and to which all the operating parts may be attached to produce a well balanced organization, with such parts protectively encased;

3. The further provision of operating mechanism in which the shutter shaft is utilized as the main drive for the intermittent and continuous film feeding mechanisms, the parts being co-related so as to effect the direct driving of the intermittent and continuous film feeding mechanisms from the shutter shaft with the minimizing of gearing therebetween;

4. The still further provision of a motion picture apparatus having parts such as the supply reel and the film illuminating device detachably mountable and movable to permit the boxing of the machine as a whole in relatively small space;

5. The further provision of a novel lens focusing device constructed and designed to permit removal of the projection lens for cleaning purposes and re-insertion of the lens without destroying the previous focus of the lens; and 6. The still further provision of a motion picture apparatus in which the film is intermittently locked in position during the dwell period thereof by simple mechanism, and in which the operating parts are designed to permit the projection of the film image when the motor is stopped.

To the accomplishment of the foregoing and such other objects as may hereinafter appear, my invention consists in the elements and their relation one to the other as hereinafter particularly described and sought to be defined in the claims; reference being had to the accompanying drawings which show the preferred embodiment of my invention, and in which:

Fig. 1 is a side elevational view of the apparatus showing the motion picture machine in projection position, Fig. 2 is a view thereof taken on the line 2—2, Fig. 1, Fig. 3 is an enlarged view taken in cross-section on the line 3—3, Fig. 2, Fig. 4 is a fragmentary view thereof taken in cross-section on the line 4—4, Fig. 1, Fig. 5 is a fragmentary view thereof taken in cross-section on the line 5—5, Fig. 1, Fig. 6 is a cross-sectional view of a detail taken on the line 6—6, Fig. 5, and Fig. 7 is a fragmentary cross-sectional view showing the means for stopping the film in exposed position when the motor is stopped.

Referring now more in detail to the drawings, the invention in one of its aspects, as heretofore stated, comprises the provision of a portable apparatus in which the motion picture machine is adjustably movable on a portable casing in which the same is boxed, the machine and the casing being so inter-related as to permit the latter to form a suitable base for the former when the machine is moved to an operating or projection position, and to produce a balanced combination with the center of gravity properly located when the machine is moved to encased position. This construction is shown particularly in Figs. 1 and 2 of the drawings, the apparatus comprising the motion picture machine A including a frame 10 carrying all the operating parts of the machine, as will be described more in detail hereinafter, and a casing B on which the frame 10 is pivotally movable. The frame and casing are provided with cooperating apertured lugs on opposite sides forming the hinge pivots 11 (one of which is shown in Fig. 1 of the drawings), the frame 10 being movable about the pivots 11 from a horizontal encased position to an erect projection position; the movement of the machine being guided by the bracket arms 12 and 13 pivotally attached to the machine frame 10 at 14 and 15 respectively, the said arms comprising arcuate slotted members which cooperate with locking elements in the form of thumb screws 16 and 17 carried respectively by the opposite side walls 18 and 19 of the casing B, the arms and locking elements being provided for guiding the movement of the machine frame 10 and for locking the same in adjusted projection position, which may be either erect as shown in Fig. 1 of the drawings, or at an angle to the vertical so that projection may be had at an angle to the horizontal.

The frame 10 comprises a casting which is designed to support the operating and operated parts of the machine to produce a well balanced organization, with such parts protectively encased; and in the preferred construction the casting includes a vertical wall 20, the bottom portion of which is provided with integral semi-cylindrical sections 21 and 22 on opposite sides of the vertical wall 20, the section 21 providing a housing for the take-up reel, as will be made clearer hereinafter, and the section 22 providing a compartment for storing or holding additional reels 23. With this construction it will be seen that the storage compartment 22 for the additional reels is arranged so that when the machine is moved to encased position the compartment is non-accessible, and when the machine is moved to operating position the compartment and the reels therein are rendered accessible. The casting frame 10 further includes an integral portion 24 at the rear thereof which forms a housing for the shutter and intermittent film moving mechanism, as will become clearer hereinafter.

As heretofore stated, it is one of the principal objects of the present invention to provide a motion picture machine in which the operating parts are simplified and coordinated to produce a relatively simple structure, the parts being correlated so as to effect a direct driving of the intermittent and continuous film feeding mechanisms from the shutter shaft with the minimizing of gearing therebetween and with a consequent eliminating of loose play between the parts. To accomplish this, the shutter shaft 25 which carries the shutter 26 is journalled in bearings 27 and 28 provided by the frame 10 (see particularly Fig. 3), and the said shutter shaft is utilized as the main drive for the intermittent and continuous film moving mechanisms; the shutter 26 being to this end designed as a combined shutter and drive wheel, the shutter being peripherally formed as particularly shown in Figs. 3 and 5 of the drawings to define a belt wheel over which is moved the driving belt 29 trained over a pulley 30 which is fixed to the shaft 31 of a motor 32. The mount or base for the motor may comprise an extension arm 33. The pulley 30 may be protectively housed or encased by a pulley guard 34 which may be attached to the casing section 24 of the frame 10.

The intermittent film moving mechanism generally designated as $a$ (see particularly Figs. 3, 5 and 6) and the continuous film moving mechanism generally designated as $b$ (see particularly Figs. 1, 2 and 3) are directly driven from the shutter shaft 25, the said mechanisms being preferably located adjacent opposite ends of the shaft so as to produce a balanced operating machine.

The intermittent film moving mechanism $a$ preferably comprises a film grip device 35 of the slip-claw variety, which is reciprocable by means of a cam follower or lever 36 which is pivoted as at 37 on a plate 38, which plate forms a closure for the shutter compartment 24, the said cam lever being provided with the oppositely positioned cam arms 39 and 40 which engage and follow a cam 41 fixed to the shutter shaft 25, the movement of the arms being aided by means of the springs 42 and 43. The film grip device 35 is preferably carried by the cam arm 39, as clearly shown in Figs 3, 5 and 6 of the drawings, the whole construction being such that the intermittent grip device is driven from the shutter shaft with the parts therebetween reduced to a minimum. The film grip element 35 may be moved transversely of the film to engage and release the same during the intermittent operation thereof; and to this end the same may comprise a claw element 35' provided with a cup-shaped portion $35^2$ (see particularly Fig. 6) which houses a spring 44 acting at one end against the end of the cup $35^2$ and at the other end against a ball bearing 45 which engages the plate 38, the end of the cup $35^2$ having contact with a cam surface 46 which may be formed peripherally on the shutter-belt wheel 26. The coordination of these parts is such that when the claw element 35' is moved downwardly, the cup portion $35^2$ of the film grip rides on the high face of the cam to engage the film, and when the film grip is moved upwardly, the cup portion $35^2$ moves on the low face of the cam and is urged by the spring 44 to release the film.

The mechanism for continuously moving the film preferably comprises the operating elements in the form of worms 47 and 48 fixed to the shutter shaft 25 at an end opposite the cam 41; and the said worms mesh with the upper and lower worm wheels 49 and 50 respectively (see Figs. 1 and 2), the said worm wheels being fixed to shafts 51 and 52 on one side of the machine frame 10, which shafts carry the upper and lower film engaging sprocket wheels 53 and 54, both of which are grooved to form belt wheels over which are trained the upper and lower belts 55 and 56 movable over the pulleys 57 and 58.

The upper pulley 57 is fixed to a stud 59 rotatable in a bracket arm 60, which arm is removably attachable to an upstanding support 61 which is preferably made integral with the machine frame 10; the attachment of the bracket arm 60 being such that the same may be moved from a vertical and operating position to a horizontal and inoperative position, as shown in Fig. 1 of the drawings, so that when the machine is not in operation the longitudinal dimensions of the machine may be substantially reduced to permit the boxing of the machine in relatively smaller confines. For supporting and locking the bracket arm in the vertical and horizontal positions, the frame 10 may be provided with a recessed seat portion 62 and with oppositely positioned retaining lugs 63 and 64 (see Fig. 1 of the drawings), the lugs being spaced from the retaining seat so as to permit the arm 60 to be retracted and moved to horizontal position and seated between the lugs and said seat. The arm 60 may be locked in either the horizontal or vertical position by means of a thumb screw 65 threadedly receivable by the element 66 which is fixed to the upstanding support 61.

The lower pulley 58 is fixed on a stud which is journalled in the frame 10, and both the upper and lower studs are adapted to receive the supply and take-up reels 67 and 68 respectively, which may be held or retained in position by means of the retaining fingers 69 and 70 pivotally carried by the shafts 71 and 72 respectively.

The plate 38 which forms the closure for the shutter housing 24 is designed to carry a combined lamp house, condenser mount and film gate generally designated as c (see particularly Figs. 1, 3 and 4), the said combined lamp house, condenser mount and film gate forming a unit which is preferably detachably mountable onto the plate 38 and is detached when the machine is to be boxed, so as to further decrease the boxing dimensions of the same. This unit comprises the film gate 73 which is hinged as at 74 and 75 onto the plate 38 in a manner such that the gate and its supported parts may be lifted from the plate 38, all as will be clear when reference is had to Fig. 4 of the drawings. The gate 73 carries the condenser lens mount 76, to which in turn is attached the lamp housing and lamp, generally designated as 77. This unit is movable on the hinges 74 and 75, and may be locked to the plate 38 by means of the locking lever 78.

In the preferred construction, there is provided a film locking means which is designed to lock the film in position during the dwell periods thereof, and to simplify the construction this film locking means is operated directly from the shutter shaft 25. Preferably, as shown in the drawings, the film locking means is in the form of a film pressure plate 79 which is pivotally carried by the film gate 73 at 80, as clearly shown in Figs. 3 and 4 of the drawings. This film pressure plate is provided with a film shoe portion 81 cooperating with the complemental film shoe portion formed in the plate 38, and the locking plate is normally urged to film engaging position by means of a plurality of springs 82, 82 housed by the condenser mount which act against the rear wall of the film locking pressure plate, the movement of the said plate being limited by the stop screw 83 fixed to the plate 79, the head of which engages a wall in the lens mount 76. For operating the film pressure locking plate to film releasing position, the same is provided with a stud 84 which is engaged by a cam 85 fixed to the end of the shutter shaft 25. In operation, as the shutter shaft rotates the cam 85 engages the stud 84 and moves the film locking plate to film releasing position when the film is to be advanced.

For stopping the film in film exposure position when the motor 32 is stopped, I preferably provide the mechanism shown in Figs. 3 and 7 of the drawings, which comprises a weighted member 86 which frictionally engages the motor shaft 31 and which, when the motor is running, is moved to the position shown in Fig. 7 of the drawings, with the weight 86' thereof stopped by part of the machine framework, so that the outer wall of the member 86 engages a spring pressed plunger 87 movable in the shutter casing 24, a locking pin 88 carried by the spring pressed plunger being then held out of engagement with the inner peripheral wall 89 of the shutter 26. The weighted member 86 is provided with a recess 90 arranged so as to provide a seat for the end of the plunger 87 when the weight 86' is moved to descended position upon stopping of the motor. When the plunger 87 so seats in the recess 90, the locking pin 88 thereof engages the peripheral wall 89 of the shutter and moves into any one of a plurality (three in number) of recesses, such as 91, provided in the peripheral wall 89 of the shutter, the arrangement of these recesses being such as to stop the shutter and the parts operated by the shutter shaft in film exposure positions.

For projecting the images onto an image receiving surface, there is provided the projection lens system generally designated as $d$. As heretofore mentioned, a desired object of the invention relates to the provision of a lens system and focusing device therefor constructed and designed to permit removal of the projection lens for cleansing purposes and to permit re-insertion of the lens without destroying the focus of the lens previously obtained. To accomplish this, the lens system and focusing device comprises a lens containing barrel 92 axially movable in a support provided by the lens mount 93 and means for moving the lens barrel axially to focus the lens, the said means being releasable to permit replacement of the lens barrel into the support after removal thereof without changing the lens focus. In the preferred construction the focusing means comprises a spring pressed plunger or pin 94 carried by the tubular element 95 which is movable in a guide 96 in the lens mount, the tubular element being provided with a screw cap 97 which may be released when the focusing device is to be moved in the guide and may be tightened to fix the same in adjusted position. The pin 94 cooperates with a groove 98 formed peripherally in the lens barrel 92, and the disposition of this groove and the guide 96 is such that when the focusing device is moved in the guide the lens will be axially adjusted, all as will be clear from a consideration of Figs. 1 and 3 of the drawings. When the lens is desired to be removed for cleansing or other purposes, the pin 94 which has an extension 94′ is retracted, and the lens barrel may thereafter be inserted in position without disturbing the previous focus obtained.

The use and operation of my improved portable motion picture machine will in the main be fully apparent from the above detailed description thereof. In threading the film through the machine, the same is taken from the supply reel and threaded over the upper sprocket 53, with which cooperates the presser roll 99, and the same may then be taken behind a guide roll 100 and threaded through the film gate and under a second guide roll 101, after which the same may be threaded over the lower sprocket 54, with which cooperates the presser roll 102, the end of the film being then attached in the usual way to the lower film reel 68. With this construction, the only operating parts of the machine that need be exposed are the sprockets 53 and 54, the other parts being protectively encased as described, and the worm and worm wheels being protectively housed by means of a gear case cover 103.

While I have shown my invention in the preferred form, it will be obvious that many changes and modifications may be made in the structure disclosed without departing from the spirit of the invention, defined in the following claims.

I claim:

1. A motion picture apparatus comprising a frame, a shutter shaft journalled therein, and intermittent film moving mechanism operated from said shutter shaft, said mechanism including a film grip element, a cam fixed to said shutter shaft and a cam lever oscillatably mounted on said frame, the said lever carrying the film grip element and operated by said cam.

2. Motion picture film driving mechanism comprising a drive shaft, a cam thereon, a pivoted cam lever having oppositely arranged arms for engaging the cam on opposite sides thereof, and a film grip element carried by one of the arms of the cam lever; the cam, the pivot of the lever and the film grip element being arranged so that the throw of the film grip element is substantially double the throw of the cam.

3. A motion picture apparatus comprising a frame, a shutter and shutter shaft journalled therein, means for intermittently moving a film including a reciprocating film grip and means including a cam on said shaft positioned on one side of said shutter for operating the film grip, and means for continuously moving the film positioned on the opposite side of said shutter and including supply and take-up sprockets each provided with a worm wheel and worms on said shaft meshing with said worm wheels.

4. A portable motion picture apparatus comprising a casing, a motion picture machine pivotally carried by said casing for movement from horizontal encased to erect operating positions, and means for adjustably locking the machine on the casing operative to permit projection at an angle to the horizontal.

5. A portable motion picture apparatus comprising a casing, a motion picture machine pivotally carried by said casing for movement from a folded or encased position to an erect operating position, and means for guiding the machine into its positions and for locking the same in adjusted position, the said means comprising spaced arms pivotally carried by the machine and locking elements carried by opposite side walls of the casing cooperating with said arms.

6. A portable motion picture apparatus comprising a casing, a frame mounted on the casing for movement from encased to operating positions, film driving mechanism carried by said frame including supply and take-up reels, the said frame being provided with a storage compartment for additional reels arranged so that when the machine is moved to encased position, the said compartment is non-accessible, and when the machine is moved to operating position, the compartment and the reels therein are rendered accessible.

7. A motion picture apparatus comprising a frame, a shutter and shutter shaft journalled therein, a cam fixed to said shaft at an end thereof, a film locking plate pivotally carried by said frame, resilient means for urging the film locking plate to engage the film, and a stud carried by said plate engageable by said cam for moving the plate against the action of said resilient means.

8. A motion picture apparatus comprising a frame, a shutter and shutter shaft journalled therein, a motor for directly driving said shutter, and mechanism for stopping said shutter in open or projection position when the said motor is stopped, the said mechanism comprising a shutter locking member, means for normally holding the said member in inoperative or unlocking position and means for operating the said member to shutter locking position when the said motor is stopped.

9. A motion picture apparatus comprising a frame, a shutter and shutter shaft journalled therein, a motor for directly driving said shutter, and mechanism for stopping said shutter in open or projection position when the said motor is stopped, the said mechanism comprising a spring pressed shutter locking member, interengaging locking means carried by said member and shutter, means actuated by the motor when the latter is operating for holding the said member in inoperative or unlocking position and for permitting movement of said member to operative or locking position when the motor is stopped.

10. A motion picture apparatus comprising a frame, a shutter and shutter shaft journalled therein, a motor for directly driving said shutter, and mechanism for stopping said shutter in open or projection position when the said motor is stopped, the said mechanism comprising a spring pressed shutter locking member, a locking pin carried thereby, spaced grooves carried by the shutter for cooperation with said locking pin, and a weighted element carried by the motor shaft and frictionally operated thereby, the said weighted element having an exterior wall which cooperates with said locking member to hold the same in inoperative position when the motor is running and provided with a groove in which the locking member seats to effect the locking of the shutter when the motor is stopped.

11. A motion picture apparatus comprising a frame including a vertical wall, film feeding means including a shaft journalled in said frame on one side of said wall, worms on said shaft and worm wheels journalled in said wall and meshing with said worms, and sprocket wheels fixed to rotate with the said worm wheels and arranged on the opposite side of said wall.

12. A motion picture apparatus comprising a frame including a vertical wall, film feeding means including a shaft journalled in said frame on one side of said wall, worms on said shaft and worm wheels journalled in said wall and meshing with said worms, and sprocket wheels fixed to rotate with the said worm wheels and arranged on the opposite side of said wall, the said sprocket wheels being grooved to define belt wheels.

13. A motion picture apparatus comprising a cast metal frame including a vertical wall section and an integral shutter casing section, film moving mechanism supported on said vertical wall section, a shutter housed by said integral shutter casing section, a plate forming a closure for said casing section, and a film gate pivotally mountable on said plate.

14. A motion picture apparatus comprising a frame including a vertical wall section and an integral shutter casing section, film moving mechanism supported on said vertical wall section, a shutter housed by said integral shutter casing section, a plate forming a closure for said casing section, and a combined film gate, condenser mount and lamp housing unit pivotally mountable on said plate.

Signed at New York city, N. Y., this 10th day of April, 1924.

FREEMAN H. OWENS.